United States Patent
Choi

(10) Patent No.: US 9,632,176 B2
(45) Date of Patent: Apr. 25, 2017

(54) DRIVER ASSISTANCE APPARATUS AND METHOD

(71) Applicant: Hyundai Motor Company, Seoul (KR)

(72) Inventor: Jae Seob Choi, Gyeonggi-Do (JP)

(73) Assignee: Hyundai Motor Company, Soul (KR)

( * ) Notice: Subject to any disclaimer, the term of this patent is extended or adjusted under 35 U.S.C. 154(b) by 16 days.

(21) Appl. No.: 14/690,435

(22) Filed: Apr. 19, 2015

(65) Prior Publication Data

US 2016/0121888 A1 May 5, 2016

(30) Foreign Application Priority Data

Oct. 29, 2014 (KR) .................. 10-2014-0148517

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *G01S 13/04* | (2006.01) | |
| *B60W 40/072* | (2012.01) | |
| *B60W 40/076* | (2012.01) | |
| *G01S 13/86* | (2006.01) | |
| *G01S 13/93* | (2006.01) | |

(52) U.S. Cl.
CPC .......... *G01S 13/04* (2013.01); *B60W 40/072* (2013.01); *B60W 40/076* (2013.01); *G01S 13/862* (2013.01); *G01S 13/867* (2013.01); *G01S 13/931* (2013.01); *B60W 2420/42* (2013.01); *B60W 2420/52* (2013.01); *B60W 2420/54* (2013.01); *B60W 2550/402* (2013.01)

(58) Field of Classification Search
USPC ............................. 701/1, 22, 42, 70
See application file for complete search history.

(56) References Cited

U.S. PATENT DOCUMENTS

| | | | | |
|---|---|---|---|---|
| 6,233,514 B1* | 5/2001 | Claussen | ................ | B60K 31/00 188/170 |
| 6,374,173 B1* | 4/2002 | Ehlbeck | ................ | B60K 31/047 180/170 |
| 6,577,334 B1* | 6/2003 | Kawai | ................ | B60G 17/0165 348/148 |
| 8,457,873 B2* | 6/2013 | Hyde | .................... | G06Q 30/02 180/65.28 |
| 9,126,597 B2* | 9/2015 | Yu | .................... | B60W 30/18118 |
| 9,272,710 B2* | 3/2016 | Jeon | ......................... | B60T 7/12 |
| 9,358,978 B2* | 6/2016 | Yoo | .................... | B60K 31/0008 |

(Continued)

FOREIGN PATENT DOCUMENTS

| | | | |
|---|---|---|---|
| JP | 2005-343299 A | 12/2005 | |
| JP | 2008-143263 A | 6/2008 | |

(Continued)

*Primary Examiner* — Ronnie Mancho
(74) *Attorney, Agent, or Firm* — Mintz Levin Cohn Ferris Glovsky and Popeo, P.C.; Peter F. Corless

(57) ABSTRACT

A driver assistance method includes: sensing whether a vehicle enters a slope road; detecting information of the slope road using sensors which are equipped in the vehicle; confirming whether the slope road is a curved road based on the information of the slope road; measuring a curvature of the slope road when the slope road is confirmed to be a curved road; and assisting a driving operation of the vehicle based on the curvature of the slope road.

18 Claims, 6 Drawing Sheets

(56) References Cited

U.S. PATENT DOCUMENTS

| | | | |
|---|---|---|---|
| 9,360,328 B2 * | 6/2016 | You | G01C 21/26 |
| 9,434,384 B2 * | 9/2016 | Kim | B60W 30/16 |
| 2005/0273216 A1 | 12/2005 | Imai et al. | |
| 2006/0220455 A1 * | 10/2006 | Schmidt | B60T 7/122 |
| | | | 303/191 |
| 2007/0090691 A1 * | 4/2007 | Maskell | B60T 7/122 |
| | | | 303/192 |
| 2010/0036564 A1 * | 2/2010 | Blaise | B60W 10/06 |
| | | | 701/42 |
| 2012/0245756 A1 * | 9/2012 | Cooprider | B60W 30/146 |
| | | | 701/1 |
| 2013/0297122 A1 * | 11/2013 | Gibson | B60W 20/40 |
| | | | 701/22 |
| 2014/0133699 A1 * | 5/2014 | Guan | G06K 9/00798 |
| | | | 382/103 |
| 2014/0336842 A1 * | 11/2014 | Jang | G06K 9/00791 |
| | | | 701/1 |
| 2014/0371949 A1 * | 12/2014 | Jeon | B60W 50/10 |
| | | | 701/1 |
| 2015/0134141 A1 * | 5/2015 | Park | B60W 50/0098 |
| | | | 701/1 |
| 2015/0148985 A1 * | 5/2015 | Jo | G08G 1/096725 |
| | | | 701/1 |
| 2015/0148986 A1 * | 5/2015 | Shin | B60W 40/06 |
| | | | 701/1 |
| 2016/0171315 A1 * | 6/2016 | Yi | G06K 9/00791 |
| | | | 382/154 |

FOREIGN PATENT DOCUMENTS

| | | |
|---|---|---|
| JP | 2011-235695 A | 11/2011 |
| KR | 10-2010-0000835 A | 1/2010 |
| KR | 10-1077581 | 4/2011 |
| KR | 10-1049901 | 7/2011 |
| KR | 10-2014-0024771 | 3/2014 |

* cited by examiner (a)

(b)

DRIVER ASSISTANCE APPARATUS AND METHOD

CROSS-REFERENCE TO RELATED APPLICATION

This application claims the benefit of and priority to Korean Patent Application No. 10-2014-0148517, filed on Oct. 29, 2014 in the Korean Intellectual Property Office, the disclosure of which is incorporated herein in its entirety by reference.

TECHNICAL FIELD

The present disclosure relates to a driver assistance apparatus and method, and more particularly, to a driver assistance apparatus and method for estimating a curvature of a slope road.

BACKGROUND

Generally, when a vehicle is parked in buildings, parking structures, or the like, a driver needs to pass through a spiraling, sloped road (i.e., curved slope road) having a small and narrow turning radius. In such case, it may become difficult for an inexperienced or unskilled driver to control and steer the vehicle, potentially causing an accident or bumping of the wheel on a side curb while turning. Meanwhile, a driver assistance apparatus can issue driving information or a risk warning so that the driver may more conveniently and safely drive the vehicle, or even prevent an accident by aggressive intervention. To this end, various systems such as a lane departure warning system and a front and rear collision warning system have been developed.

However, the related art has a problem in that conventional driver assistance technology for driving on a curved slope road is under-developed.

SUMMARY

The present disclosure has been made to solve the above-mentioned problems occurring in the related art while advantages achieved by the related art are maintained intact.

An aspect of the present disclosure provides a driver assistance apparatus and method for estimating a curvature of a slope road by recognizing a width of the slope road when a vehicle is driven on a curved slope road to guide a steering trajectory.

According to embodiments of the present disclosure, a driver assistance method includes: sensing whether a vehicle enters a slope road; detecting information of the slope road using sensors which are equipped in the vehicle; confirming whether the slope road is a curved road based on the information of the slope road; measuring a curvature of the slope road when the slope road is confirmed to be a curved road; and assisting a driving operation of the vehicle based on the curvature of the slope road.

The sensing of whether the vehicle enters the slope road may include: matching absolute coordinates of the vehicle to map data to confirm a current position of the vehicle and to sense whether the vehicle enters the slope road.

The sensing of whether the vehicle enters the slope road may include: analyzing an environment around the vehicle based on data measured by a camera and an ultrasonic sensor to sense whether the vehicle enters the slope road.

The method may further include: sensing whether a vehicle enters a building; and causing an alarm, using a switch, when it is sensed that the vehicle has entered a building.

The detecting of the information of the slope road may include: fusing data measured by at least one of: an image sensor, an ultrasonic sensor, and a radar sensor.

The information of the slope road may include a width of the slope road, a slope road type, a gradient of the slope road, and the curvature of the slope road.

The slope road type may be determined to be any one of an uphill road and a downhill road, based on a change in the width of the slope road.

The gradient of the slope road may be estimated based on a convergence and divergence degree which is obtained by calculating a convergence and divergence degree of a boundary line of the slope road within an image.

The measuring of the curvature of the slope road may include: converting the image into a plane based on the gradient; converting the converted image into a slope road having the same width in accordance with the convergence and divergence degree; and detecting a curvature of the converted slope road.

The assisting of the driving operation may include: displaying a guideline for steering control based on the curvature of the slope road.

Furthermore, according to embodiments of the present disclosure, a driver assistance apparatus includes: a navigator configured to confirm a position of a vehicle; an image acquisition device configured to photograph images around the vehicle; a detector configured to detect objects around the vehicle; a curvature measurer configured to measure a curvature of a slope road on which the vehicle is driven based on information acquired by the image acquisition device and the detector; and a controller configured to: i) detect information of the slope road when sensing that the vehicle enters the slope road based on information acquired by the navigator, the image acquisition device, and the detector, ii) confirm whether the slope road is a curved road based on the information of the slope road, and iii) assist the driving operation of the vehicle based on the curvature of the slope road.

The image acquisition device may be implemented as at least one of: an around-view monitoring (AVM) system, a wide view camera, and a monocular camera.

The detector may include an ultrasonic sensor and a radar sensor.

The information of the slope road may include a width of the slope road, a slope road type, a gradient of the slope road, and the curvature of the slope road.

The controller may be further configured to detect boundary lines of the slope road from an image acquired by the image acquisition device and to detect the width of the slope road based on a linear distance between the detected boundary lines.

The controller may be further configured to calculate a convergence and divergence degree of the boundary lines of the slope road within the image to estimate the gradient of the slope road based on the calculated convergence and divergence degree.

The controller may be further configured to: i) convert the image into a plane based on the gradient of the slope road; ii) convert the image into a slope road having the same width in accordance with the convergence and divergence degree; and iii) detect a curvature of the converted slope road.

Furthermore, according to embodiments of the present disclosure, a non-transitory computer readable medium containing program instructions for performing a driver assistance method includes: program instructions that sense whether a vehicle enters a slope road; program instructions that detect information of the slope road using sensors which are equipped in the vehicle; program instructions that confirm whether the slope road is a curved road based on the information of the slope road; program instructions that measure a curvature of the slope road when the slope road is confirmed to be a curved road; and program instructions that assist a driving operation of the vehicle based on the curvature of the slope road.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
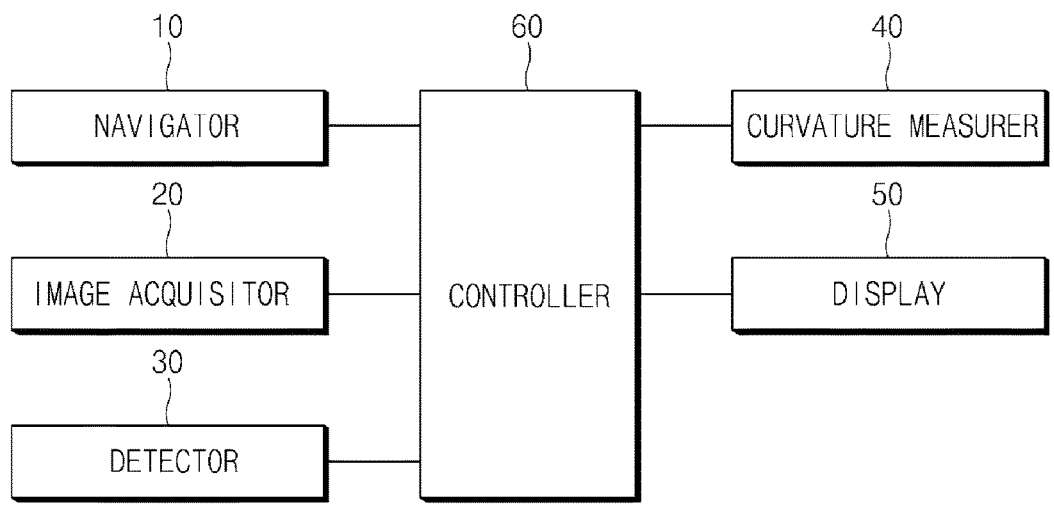
FIG. 1 is a block configuration diagram of a driver assistance apparatus according to embodiments of the present disclosure.

Referring now to embodiments of the present disclosure, as illustrated in FIG. 1, a driver assistance apparatus includes a navigator 10, an image acquisition device 20 (i.e., "image acquisitor"), a detector 30, a curvature measurer 40, a display 50, and a controller 60.

The navigator 10 acquires absolute coordinates of a vehicle through a global positioning system (GPS) receiver (not illustrated) and matches the absolute coordinates with map data stored in a memory (not illustrated), thereby confirming a current position of the vehicle.

The image acquisition device 20 is equipped in the vehicle to photograph image around the vehicle. The image acquisition device 20 is implemented as an around view monitoring (AVM) system, a wide angle camera, a monocular camera, and the like. For example, the image acquisition device 20 photographs a front image in a driving direction of a vehicle in response to a control of the controller 60.

The detector 30 is equipped in a vehicle to detect objects around the vehicle. The detector 30 includes an ultrasonic sensor and a radar sensor.

The curvature measurer 40 uses information acquired by the image acquisition device 20 and the detector 30 to measure a curvature of a slope road.

The display 50 displays information on a curvature, a guide line, a warning, and the like in front of a driving direction of a vehicle. In this case, the display 50 overlappingly displays information on the image acquired by the image acquisition device 20.

The display 50 may be implemented as a liquid crystal display, a flexible display, a transparent display, a light emitting display (LED), a head-up display (HUD), and the like.

The controller 60 confirms whether a vehicle enters a slope road on the basis of positional information of the vehicle and environmental information around the vehicle. That is, the controller 60 confirms whether a vehicle enters a slope road on the basis of the information acquired by the navigator 10, the image acquisition device 20, and the detector 30.

There are three methods for confirming whether a vehicle enters a slope road. First, it is confirmed whether a vehicle enters a slope road by confirming a position of the vehicle using the navigation. For example, the controller 60 confirms the position of the vehicle using the navigator 10 to detect whether the vehicle tries to enter an underground parking lot of a building and recognizes that the vehicle enters the slope road when the vehicle tries to enter the underground parking lot. Second, the controller 60 analyzes environment around a vehicle to confirm whether the vehicle enters the slope road. In other words, the controller 60 analyzes environment around a vehicle on the basis of data measured by the sensors equipped in the vehicle, such as the image acquisition device 20 and the detector 30, to confirm that the vehicle enters the slope road. For example, when the controller 60 senses curbs at both sides of a road, whether a vehicle passes through a parking control gate, or a warning sound when a vehicle enters an indoor parking lot, and the like using the sensors, the controller 60 recognizes that the vehicle enters a slope road. Third, it is recognized whether a vehicle enters a slope road using an input of a driver. That is, when a switch having a function of alarming that a vehicle enters a building is separately provided, the controller 60 recognizes that a vehicle enters a slope road once it senses an input of the switch. Here, as the switch, an emergency light switch or a head light switch may also be used.

When sensing that a vehicle enters a slope road, the controller 60 detects information on the slope road using the image acquisition device 20 and the detector 30. Here, the information on the slope road includes a width of a slope road, a slope road type (e.g., uphill road, downhill road, and the like), a gradient, and a curved road.

The controller 60 fuses the information acquired by the image acquisition device 20 and the detector 30 to detect a current width of a slope road. In this case, the controller 60 detects a curb, a central reservation, a driving guide line, and the like as boundary lines of a slope road within the image acquired by the image acquisition device 20 and obtains a linear distance between the detected boundary lines as the width of the slope road. Alternatively, the controller 60 measures a distance between a wall surface or obstacles and a vehicle using the ultrasonic sensor or the radar sensor and calculates the width of the slope road using the measured distance information.

Figure 2:
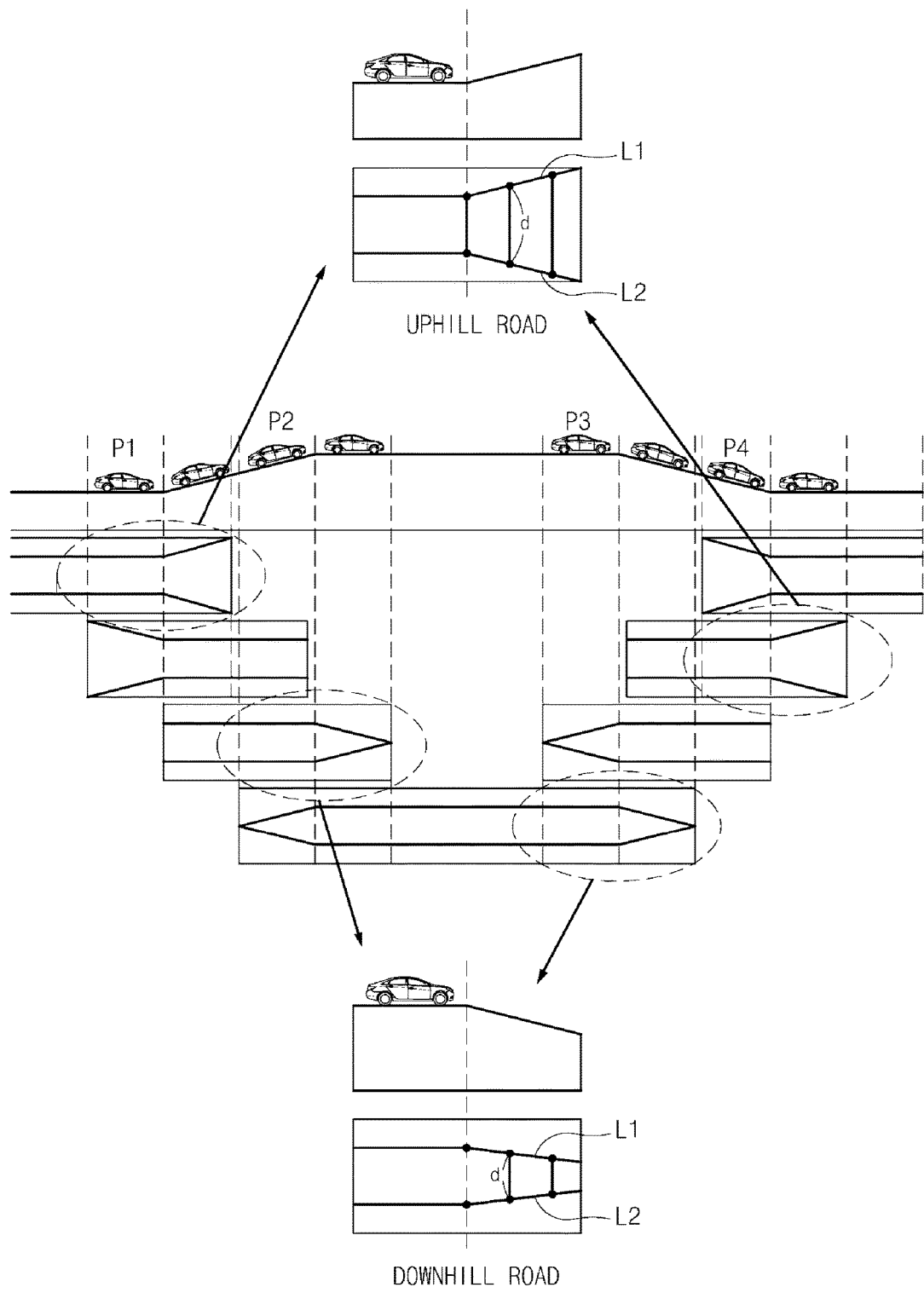
FIG. 2 is a diagram illustrating an example in which a shape of a slope road is displayed within front and rear images depending on a position of a vehicle which is associated with embodiments of the present disclosure.

The controller 60 uses the image information acquired by the image acquisition device 20 to confirm the slope road type. For this purpose, the controller 60 detects boundary lines L1 and L2 of a slope road which are a straight line or a curved line using the image information and measures a width d of a slope road by referring to the measurement value of the ultrasonic sensor. Further, as illustrated in FIG. 2, the controller 60 recognizes as a starting point P1 of an uphill road or an ending point P4 of a downhill road in the case in which the width of the slope road in front of a driving direction of a vehicle is getting wider and recognizes as a starting point P2 of the downhill road or an ending point P3 of the uphill road in the case in which the width of the slope road is getting narrower.

Figure 3:
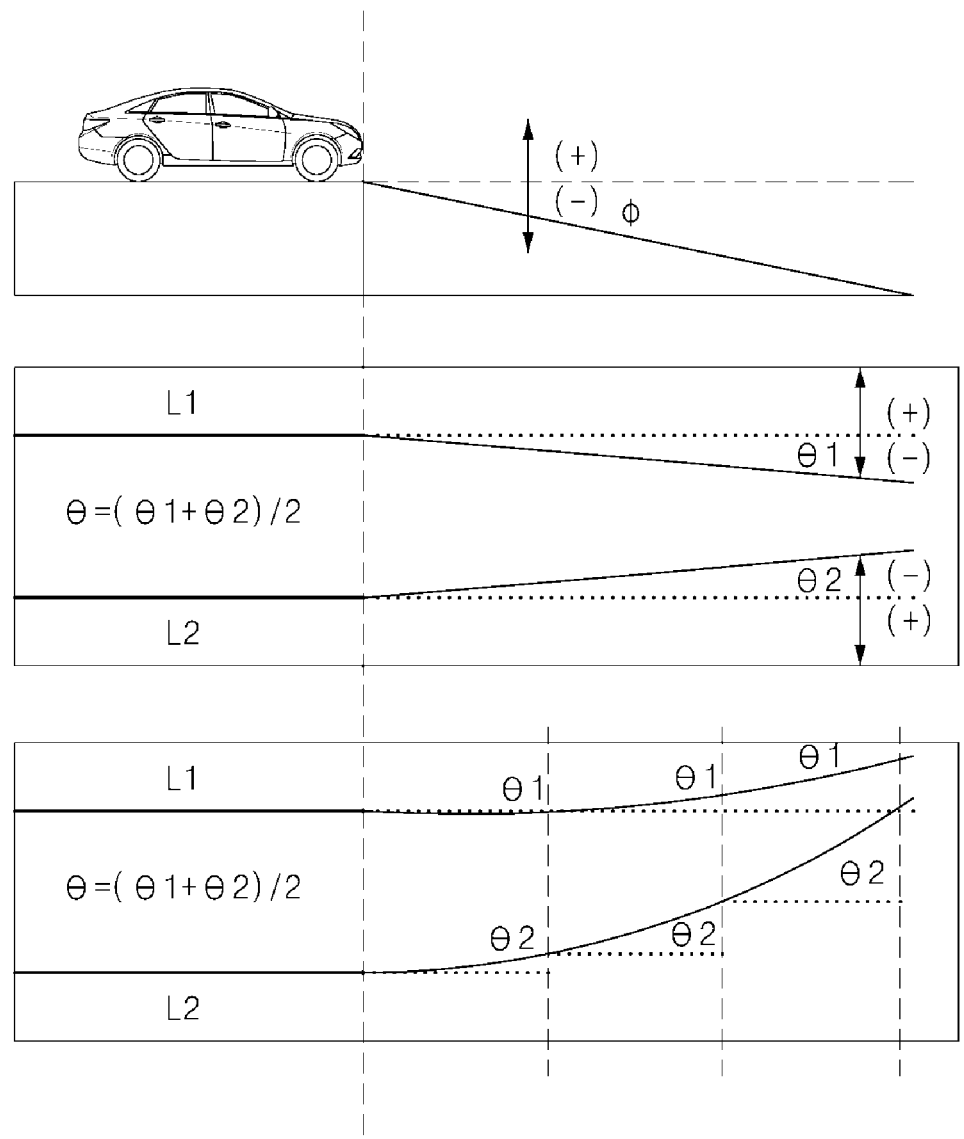
FIG. 3 is a conceptual diagram for describing a method for detecting a gradient according to embodiments of the present disclosure.

The controller 60 uses the width of the slope road to calculate a slope of the boundary lines of the slope road, thereby detecting a gradient. Referring to FIG. 3, the controller 60 extracts the left and right boundary lines L1 and L2 of the driving road (i.e., slope road) within the image acquired by the image acquisition device 20 to calculate a slope road. Further, the controller 60 calculates convergence/divergence degrees of the left and right boundary lines L1 and L2 based on the following Equation 1.

$$\theta = (\theta 1 + \theta 2)/2 \qquad \text{[Equation 1]}$$

In the above Equation 1, when θ is (−), the boundary line is a converging direction and when θ is (+), the boundary line is a diverging direction.

When a driving road is not a straight road but a curved road, as illustrated in a lower portion of FIG. 3, the controller 60 segments the curved road to calculate the convergence or divergence degrees of the boundary lines for each segmentation area, thereby obtaining an average value thereof. Here, the controller 60 may adjust a segmentation step depending on a curvature value.

The controller 60 estimates a gradient Ø corresponding to the convergence/divergence degrees θ of the left and right boundary lines based on an equation or a lookup table which defines a relationship between the convergence/divergence degrees θ and the gradient Ø of a driving road. Here, since the case in which the gradient is (−) is a downhill road and the case in which the gradient is (+) is an uphill road, the larger the value, the larger the gradient.

Figure 4:
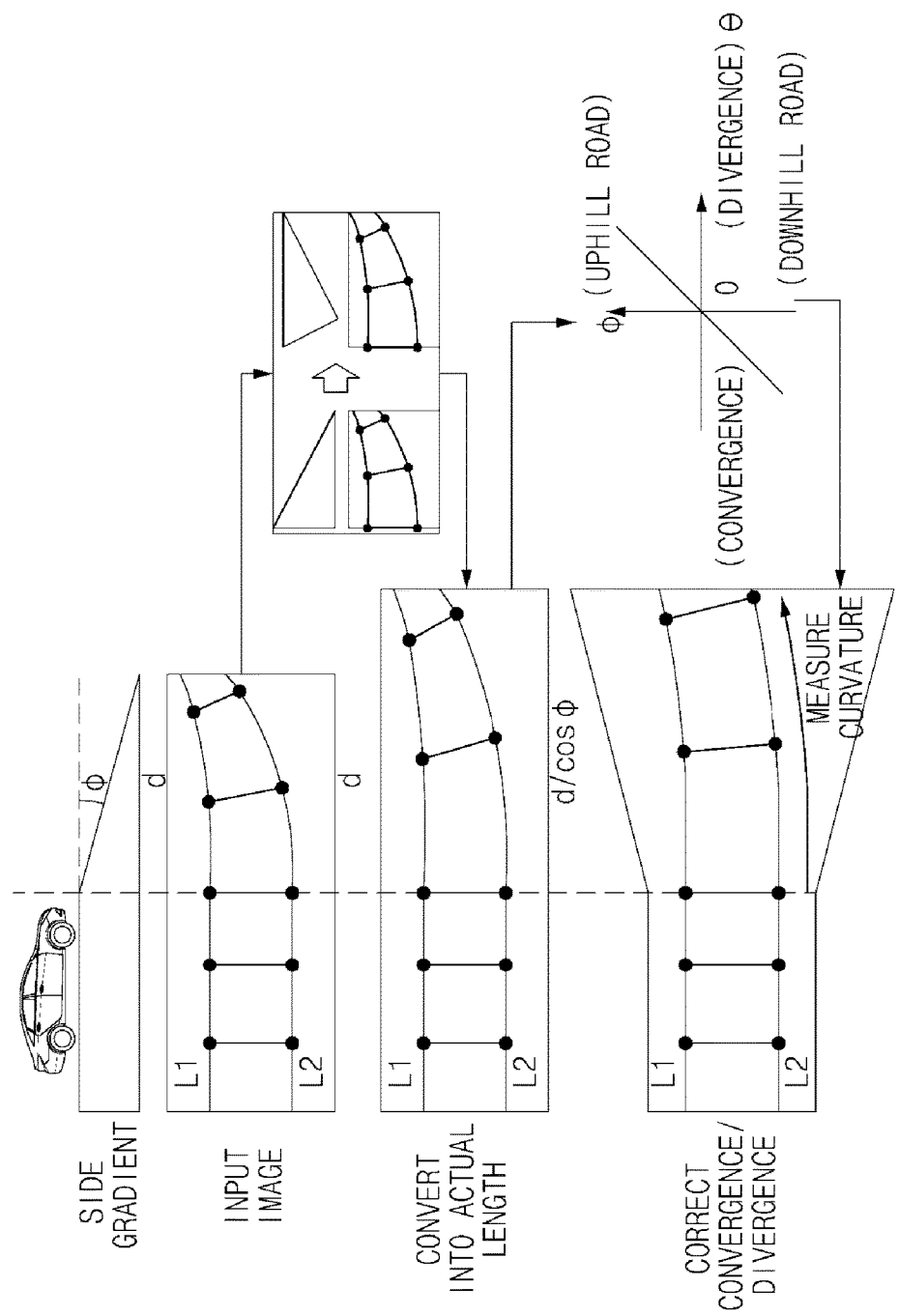
FIG. 4 is a diagram illustrating an example of correcting a curvature in consideration of the gradient according to embodiments of the present disclosure.

When a slope road into which a vehicle is entered is a curved road, the controller 60 measures the curvature of the slope road using the curvature measurer 40 in consideration of whether the slope road is the uphill road/downhill road which are previously recognized and the gradient. That is, the controller 60 corrects the curvature of the slope road within the image in consideration of the gradient as illustrated in FIG. 4.

The controller 60 converts the image acquired by the image acquisition device 20 into a plane based on the gradient to measure the curvature. In this case, even though the downhill road and the uphill road are converted into the plane, the convergence/divergence type is maintained.

The controller 60 converts the image into the driving road (i.e., slope road) having the same width in consideration of the convergence/divergence degree. Further, the controller 60 detects (i.e., measures) a curvature of the converted driving road.

Figure 5:
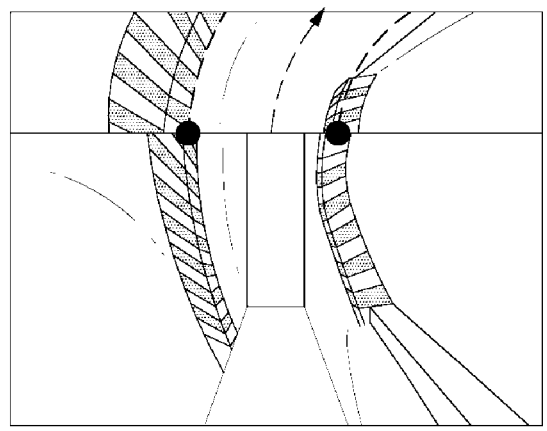
FIG. 5 is a screen on which a guide line depending on the curvature according to embodiments of the present disclosure is displayed.
Figure 5:
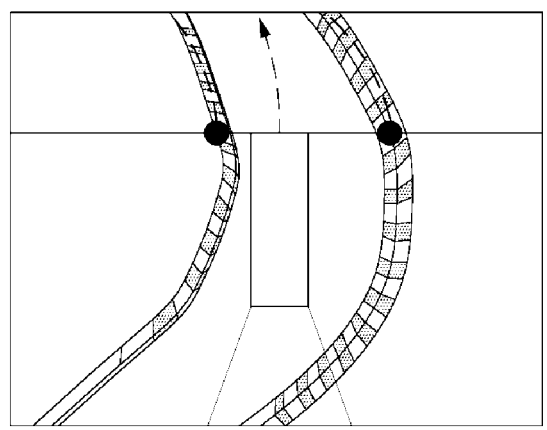

The controller 60 assists a driving operation of a vehicle on the basis of the measured curvature. For example, the controller 60 displays a guide line based on the measured curvature to induce a steering manipulation of a driver on the display 50 as illustrated in FIG. 5.

Further, the controller 60 may control a steering apparatus (not illustrated) depending on the measured curvature to automatically control a steering of a vehicle.

Figure 6:
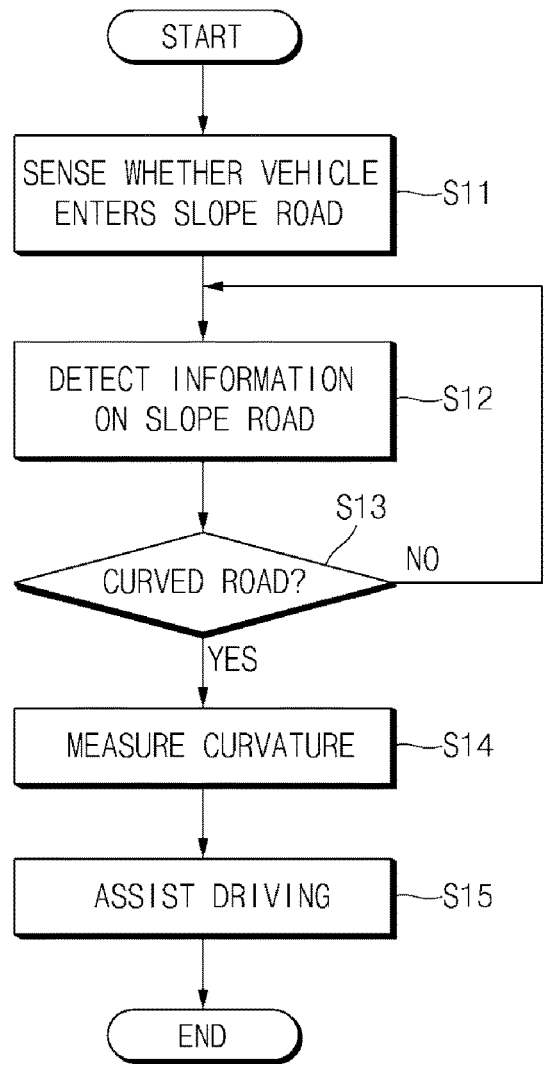
FIG. 6 is a flow chart illustrating a driver assistance method according to embodiments of the present disclosure.

FIG. 6 is a flow chart illustrating a driver assistance method according to embodiments of the present disclosure. Referring to FIG. 6, the controller 60 of the driver assistance apparatus senses whether a vehicle enters a slope road on the basis of positional information of a vehicle and environmental information around a vehicle (S11). That is, the controller 60 confirms whether a vehicle enters a slope road on the basis of the information acquired by the navigator 10, the image acquisition device 20, and the detector 30.

The controller 60 detects the information on the slope road using the image acquisition device 20 and the detector 30 (S12). Here, the information on the slope road includes information such as the width of the slope road, the slope road type, the gradient, and a curved road.

The controller 60 confirms whether the slope road is the curved road on the basis of the information on the slope road (S13). For example, the controller 60 extracts the boundary line of the slope road from the image acquired by the image acquisition device 20 and confirms whether the slope road is the curved road or the straight road on the basis of the shape of the extracted boundary line.

The controller 60 measures the curvature of the slope road using the curvature measurer 40 when the slope road is the curved road (S14). The controller 60 assists a driving operation of a vehicle on the basis of the measured curvature (S15). For instance, the controller 60 displays a steering trajectory on the display 50 based on the measured curvature to guide the steering manipulation of the driver.

As described above, according to embodiments of the present disclosure, it is possible to guide the steering trajectory (i.e., guideline) by recognizing the width of the slope road using various types of sensors which are equipped in the vehicle when the vehicle is driven on the slope road and estimating the curvature of the curved slope road using the recognized width of the slope road so as to assist the steering manipulation of the driver. In particular, it is possible to let the inexperienced driver or the unskilled driver more conveniently and safely pass through the narrow curved slope road when the vehicle is parked in buildings, parking buildings, and the like.

Further, it is possible to confirm a portion which is invisible due to the front surface of the vehicle when the vehicle is driven on the downhill road and secure the driver's view for the blind spot. Even further, the method for sensing an uphill road and a downhill road according to embodiments of the present disclosure may be applied to a real road.

Meanwhile, all the components configuring the embodiments of the present disclosure are described as coupled in one or operated, being coupled with each other, but the present disclosure is not necessarily limited to the embodiments. That is, all the components may be operated, being optionally coupled with each other within the scope of the present disclosure.

Further, unless particularly described to the contrary, the term "comprise", "configure", "have", or the like which are described herein will be understood to imply the inclusion of the stated components, and therefore should be construed as including other components, not the exclusion of any other components. Unless differently defined, it is to be understood that all the terms including technical and scientific terms have the same meaning as those that are generally understood by those who skilled in the art. It must be understood that generally used terms like the terms defined by the dictionary are identical with the meanings within the context of the related art, and unless clearly defined in the present disclosure, they should not be construed as ideally or excessively formal meaning.

It will be appreciated by those skilled in the art that various modifications and alterations can be made without departing from the essential characteristics of the present disclosure. Accordingly, the embodiments disclosed in the present disclosure and the accompanying drawings are used not to limit but to describe the spirit of the present disclosure. The scope of the present disclosure is not limited only to the embodiments and the accompanying drawings. The protection scope of the present disclosure must be analyzed by the appended claims and it should be analyzed that all spirits within a scope equivalent thereto are included in the appended claims of the present disclosure.

What is claimed is:

1. A driver assistance method, comprising:
   sensing, by a controller, whether a vehicle enters a slope road;
   detecting, by the controller, information of the slope road using sensors which are equipped in the vehicle;
   confirming, by the controller, whether the slope road is a curved road based on the information of the slope road;
   measuring, by the controller, a curvature of the slope road when the slope road is confirmed to be a curved road; and
   controlling, by the controller, a steering apparatus of the vehicle based on the curvature of the slope road,
   wherein the measuring of the curvature of the slope road includes:
       calculating, by the controller, a slope of left and right boundary lines of the slope road;
       detecting, by the controller, a gradient using the slope of the boundary; and
       calculating, by the controller, the curvature of the slope road using the gradient.

2. The driver assistance method according to claim 1, wherein the sensing of whether the vehicle enters the slope road comprises:
   matching, by the controller, absolute coordinates of the vehicle to map data to confirm a current position of the vehicle and to sense whether the vehicle enters the slope road.

3. The driver assistance method according to claim 1, wherein the sensing of whether the vehicle enters the slope road comprises:
   analyzing, by the controller, an environment around the vehicle based on data measured by a camera and an ultrasonic sensor to sense whether the vehicle enters the slope road.

4. The driver assistance method according to claim 1, further comprising: sensing, by the controller, whether a vehicle enters a building; and
   causing, by the controller, an alarm, using a switch, when it is sensed that the vehicle has entered a building.

5. The driver assistance method according to claim 1, wherein the detecting of the information of the slope road comprises:
   fusing, by the controller, data measured by at least one of: an image sensor, an ultrasonic sensor, and a radar sensor.

6. The driver assistance method according to claim 5, wherein the information of the slope road includes a width of the slope road, a slope road type, a gradient of the slope road, and the curvature of the slope road.

7. The driver assistance method according to claim 6, wherein the slope road type is determined to be any one of an uphill road and a downhill road, based on a change in the width of the slope road.

8. The driver assistance method according to claim 6, wherein the gradient of the slope road is estimated based on a convergence and divergence degree which is obtained by calculating a convergence and divergence degree of a boundary line of the slope road within an image.

9. The driver assistance method according to claim 8, wherein the measuring of the curvature of the slope road comprises:
   converting, by the controller, the image into a plane based on the gradient;
   converting, by the controller, the converted image into a slope road having the same width in accordance with the convergence and divergence degree; and
   detecting, by the controller, a curvature of the converted slope road.

10. The driver assistance method according to claim 1, wherein the assisting of the driving operation comprises:
    displaying, by the controller, a guideline for steering control based on the curvature of the slope road.

11. A driver assistance apparatus, comprising: a navigator configured to confirm a position of a vehicle;

an image acquisition device configured to photograph images around the vehicle; a detector configured to detect objects around the vehicle;

a curvature measurer configured to measure a curvature of a slope road on which the vehicle is driven based on information acquired by the image acquisition device and the detector; and a controller configured to: i) detect information of the slope road when sensing that the vehicle enters the slope road based on information acquired by the navigator, the image acquisition device, and the detector, ii) confirm whether the slope road is a curved road based on the information of the slope road, and iii) control a steering of the vehicle based on the curvature of the slope road, wherein the controller is configured to calculate a slope of left and right boundary lines of the slope road; detect a gradient using the slope of the boundary; and calculate the curvature of the slope road using the gradient.

12. The driver assistance apparatus according to claim 11, wherein the image acquisition device is implemented as at least one of: an around-view monitoring (AVM) system, a wide view camera, and a monocular camera.

13. The driver assistance apparatus according to claim 11, wherein the detector includes an ultrasonic sensor and a radar sensor.

14. The driver assistance apparatus according to claim 11, wherein the information of the slope road includes a width of the slope road, a slope road type, a gradient of the slope road, and the curvature of the slope road.

15. The driver assistance apparatus according to claim 14, wherein the controller is further configured to detect boundary lines of the slope road from an image acquired by the image acquisition device and to detect the width of the slope road based on a linear distance between the detected boundary lines.

16. The driver assistance apparatus according to claim 15, wherein the controller is further configured to calculate a convergence and divergence degree of the boundary lines of the slope road within the image to estimate the gradient of the slope road based on the calculated convergence and divergence degree.

17. The driver assistance apparatus according to claim 16, wherein the controller is further configured to: i) convert the image into a plane based on the gradient of the slope road, ii) convert the image into a slope road having the same width in accordance with the convergence and divergence degree; and iii) detect a curvature of the converted slope road.

18. A non-transitory computer readable medium containing program instructions for performing a driver assistance method, comprising:

program instructions that sense whether a vehicle enters a slope road;

program instructions that detect information of the slope road using sensors which are equipped in the vehicle;

program instructions that confirm whether the slope road is a curved road based on the information of the slope road;

program instructions that measure a curvature of the slope road when the slope road is confirmed to be a curved road; and program instructions that control a steering apparatus of the vehicle based on the curvature of the slope road, wherein the program instructions that measure the curvature of the slope road include: program instructions that calculate a slope of left and right boundary lines of the slope road;

program instructions that detect a gradient using the slope of the boundary; and program instructions that calculate the curvature of the slope road using the gradient.

* * * * *